Figure 1:
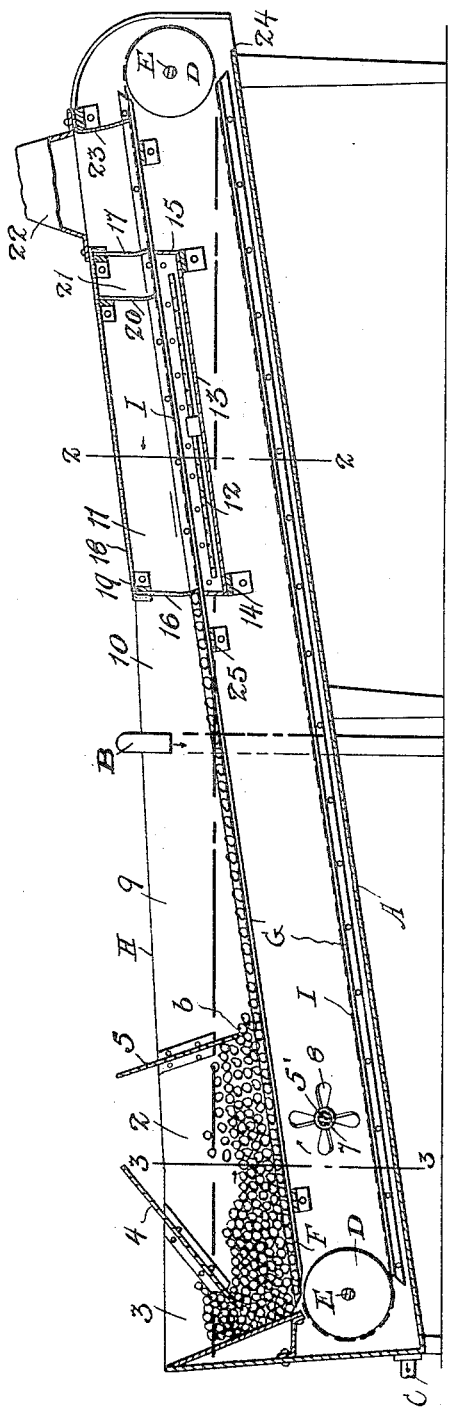

W. A. BECKETT.
COMBINED FRUIT WASHER AND SCALDER.
APPLICATION FILED DEC. 16, 1920.

1,390,268.

Patented Sept. 13, 1921.

W. A. Beckett
INVENTOR.

BY Egerton R. Case
ATTORNEY.

UNITED STATES PATENT OFFICE.

WILLIAM AUSTON BECKETT, OF KINGSVILLE, ONTARIO, CANADA.

COMBINED FRUIT WASHER AND SCALDER.

1,390,268.  Specification of Letters Patent.  Patented Sept. 13, 1921.

Application filed December 16, 1920. Serial No. 431,106.

*To all whom it may concern:*

Be it known that I, WILLIAM AUSTON BECKETT, a subject of the King of Great Britain, residing in the town of Kingsville, county of Essex, Province of Ontario, Canada, have invented certain new and useful Improvements in Combined Fruit Washers and Scalders, of which the following is a specification.

My invention relates to improvements in combined fruit-washers and scalders, and relates more particularly to the production of an apparatus of the class set forth designed particularly for use in connection with the canning of tomatoes and similar fruit, and the object of the invention is to agitate the body of water within the contrivance in such a manner as to cause the individual fruit therein to be rolled one against the other thereby producing sufficient surface friction in order to remove soluble foreign matter attaching to the exterior thereof, such as clay, and to perform this function much more expeditiously and thoroughly and without injuring the fruit than is possible by hand. Another object of the invention is to utilize the water current within the washing chamber to assist in depositing the washed fruit in a layer within what I may term the rinsing chamber so that as the fruit passes through this rinsing chamber any foreign matter that may remain commingled therewith will be effectually removed therefrom prior to the passing of the fruit into what I term the sorting chamber, and in the following specification I shall describe the preferred form of construction illustrated in the drawings forming part thereof, and what I claim as new will be set forth in my claims.

Figure 2:
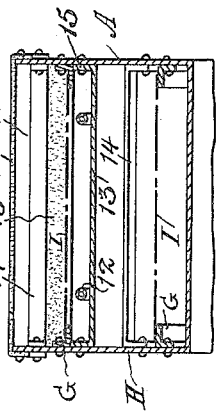
Figure 4:
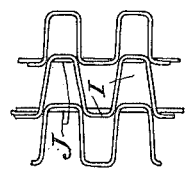
Figure 3:
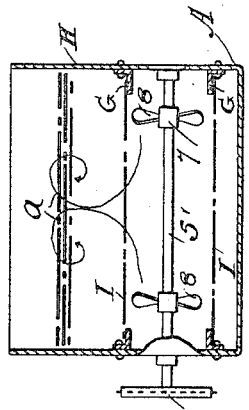

Figure 1 is a vertical central longitudinal section through my preferred form of apparatus. Figs. 2 and 3 are vertical cross-sections on the lines 2—2, and 3—3, respectively, Fig. 1, and Fig. 4 is a plan view of a portion of the preferred form of conveyer-belt used.

In the drawings like characters of reference refer to the same parts.

My apparatus comprises a suitable receptacle provided with a water supply and an outlet. Mounted in each end of said receptacle is a pulley around which passes an endless conveyer-belt whereby the fruit is conveyed from the intake end of the apparatus to its discharge end. At said intake end I provide an adjustable hopper which communicates with the washing chamber, and at the discharge end of said washing chamber I provide adjustable means to regulate the passage of the fruit from the washing chamber into the rinsing chamber. At one end of the rinsing chamber I provide what I term a sorting chamber so that, as the fruit is carried therethrough on the conveyer-belt, green and otherwise imperfect fruit may be removed by hand. As the fruit passes from the sorting chamber it is carried into the scalding chamber wherein it is subjected to the action of steam in order to crack or loosen the skin so that the fruit can be easily peeled. At the outlet end of said scalding chamber I provide a discharge flue for the spent steam. Conveniently located below the washing chamber is suitable means to agitate the water in the desired manner for the purpose before set forth.

Although forming no part of my invention, it will be understood that the supply of steam must be regulated by the operator so as to prevent overscalding of the fruit.

The conveyer-belt is located in an inclined position so that at the desired point, that is within the sorting chamber, the fruit will be lifted above the top of water and thus facilitate handling the same for sorting purposes.

A is any suitable receptacle provided with a water supply B and an outlet C. Mounted at each end of the receptacle A is a pulley D, by means of suitable shafts E. The lower pulley D is preferably the driven pulley, and of course this may be driven by any suitable means. F is the endless conveyer-belt which passes over the pulleys D, and the same is supported at each side by any suitable means such as angle bars G which are attached to the inner side of the side walls H of the receptacle A.

The conveyer-belt F is preferably made of wire bent into oppositely-facing loops I. The ends of the inner loops are supported on longitudinal members J, as shown in Fig. 4, and the elements of the said belt are so combined that the necessary pockets are provided in which the fruit finds lodgment. This is a well-known form of conveyer-belt, and although it is supported at its edges by the angle bars G its construction will not permit of its undue sagging.

2 is the washing chamber and 3 the hopper in which the fruit is placed in the first instance. This hopper is provided with an adjustable cut-off 4 to regulate the flow of fruit therefrom.

At the discharge end of the washing chamber I provide a suitable cut-off 5 which insures that the fruit passing from the washing chamber will be spread out upon the conveyer-belt in a layer. The cut-offs 4 and 5 are adjustably held in any suitable means carried by the side walls H, and as the construction I employ is well-known in various arts no further description thereof is necessary.

Mounted below the said chamber 2 is a shaft 5' driven by any suitable means such as a sprocket-wheel 6. Mounted on the said shaft are propelling wheels 7 the blades 8 of which are set at the required angle so that when these wheels are rotated in the direction indicated by arrow currents are set up in the water which will cause the fruit to rub one against the other, and the ultimate direction of the flow of the agitated water will be toward the outlet of the washing chamber 2.

9 is the rinsing chamber, and the same is located immediately beyond the cut-off 5. It will be seen clearly upon referring to Fig. 1 that the fruit is deposited in a layer upon the conveyer-belt F within said rinsing chamber thus insuring that each individual fruit will be thoroughly cleansed of all soluble foreign matter attaching to the exterior thereof. 10 is that portion of the apparatus located at the upper end of the rinsing chamber substantially where the fruit emerges from the water so as to permit of the ready removal of green or otherwise imperfect fruit.

As the fruit passes from the sorting chamber 10 it enters the scalding chamber 11, as of course the conveyer-belt F passes therethrough. This scalding chamber may be of any suitable construction, so as to receive and sufficiently retain steam escaping from the apertured pipes 12 fed from any suitable source. The preferred form of construction of scalding chamber comprises a bottom 13 suitably supported on cross members 14 which are attached to the side walls H. The said bottom 13 is provided with side and end flanges 15. The ends of the scalding chamber are closed by flaps made of any suitable material, such as heavy canvas. 16 is the flap at the intake end of the scalding chamber 11 and 17 is the flap at the discharge end thereof. These flaps yield sufficiently to permit the fruit to have the desired path of movement and are sufficiently effective to prevent undue escape of steam. 18 is the top of the scalding chamber 11, and the same together with the flaps 16 and 17 are supported by any suitable means such as cross-bars 19 suitably carried by the side walls H of the receptacle A.

If desired a cut-off flap 20 may be mounted within the scalding chamber 11 and supported from the side walls H. This cut-off flap 20 is spaced behind the flap 17 thus forming a chamber 21 which will act more or less as a check, at times, to prevent unnecessary escape of steam from the scalding chamber.

Located at the upper end of the apparatus is a flue 22 to carry away the spent steam that escapes from the scalding chamber 11, and depending from the upper side of this flue is a flap 23 which in effect acts as a trap to cause the bulk of the steam to escape through the flue 22. The fruit is of course conveyed underneath the flap 23 and passing over the upper pulley D is discharged at the point 24 into any suitable receptacle (not shown).

25 are suitable cross pieces carried by the side walls H to brace the angle bars G.

Upon referring particularly to Fig. 3 it will be seen that the angular disposition of the blades 8 of the wheels 7 will force currents of water from the sides of the receptacle A toward the center thereof thus causing gyratory currents which will cause the fruit to rotate to give the desired positive frictional contact thereof. The directions of these gyratory currents are shown substantially by the arrows *a* in Fig. 3.

It is clear that besides the gyratory currents just mentioned the disposition of the blades 8 will also cause currents of water to travel longitudinally of the receptacle A through the washing chamber 2 with the result that the fruit will be rolled *en masse* toward the outlet *b* of the cut-off 5. This cut-off 5 will insure that only sufficient fruit will be deposited on the conveyer-belt F as it passes through the rinsing chamber 9 so that the fruit will be ultimately properly scalded.

While I have described what I consider to be the best embodiment of my invention I desire it to be understood that the principle may be embodied in various forms without going outside the scope of my claims.

What I claim is:

1. An apparatus of the class described comprising a suitable receptacle adapted to receive and to discharge water; pulleys journaled respectively one at the intake end of said receptacle and the other at the discharge end thereof; a conveyer-belt mounted on said pulleys and adapted to be moved thereby; a washing chamber located at the intake end of said receptacle and provided with a controlled outlet; a shaft mounted within said receptacle and immediately below said washing chamber; blade-provided wheels mounted on said shaft, and spaced apart, the angular disposition of the blades being such that as said wheels are rotated opposing gyratory currents will be set-up within the water, and currents induced longitudinally of the receptacle, for the purpose set forth: an open sorting chamber disposed to receive the fruit as it passes from said washing chamber, and a scalding chamber through which said conveyer-belt passes in order to convey the washed fruit into and through said scalding chamber.

2. An apparatus of the class described comprising a suitable receptacle adapted to receive and discharge water, and having an inclined bottom; pulleys journaled respectively one at the intake end of said receptacle and the other at the discharge end thereof; a conveyer-belt mounted on said pulleys and adapted to be moved thereby; a washing chamber located at the intake end of said receptacle and provided with a controlled outlet; a shaft mounted within said receptacle and immediately below said washing chamber; blade-provided wheels mounted on said shaft, and spaced apart, the angular disposition of the blades being such that as said wheels are rotated opposing gyratory currents will be set-up within the water, and currents induced longitudinally of the receptacle, for the purpose set forth: an open sorting chamber disposed to receive the fruit as it passes from said washing chamber, and a scalding chamber through which said conveyer-belt passes in order to convey the washed fruit into and through said scalding chamber.

3. An apparatus of the class described comprising a suitable receptacle; a pulley mounted at each end of said receptacle; a conveyer-belt mounted on said pulleys; a washing chamber located at the intake end of said receptacle and provided with an adjustable cut-off at the outlet end thereof, and wheels mounted to operate within said receptacle and below said washing chamber and provided with blades set at an angle so that when the wheels rotate opposing gyratory currents of water will be generated to agitate the fruit within said washing chamber as set forth and for the purposes specified.

WILLIAM AUSTON BECKETT.

Witnesses:
   HILTON A. MENOECEE,
   GEORGE S. GOODEVE.